United States Patent [19]

Van Rosmalen

[11] Patent Number: 5,579,295
[45] Date of Patent: Nov. 26, 1996

[54] SCANNING DEVICE AND OPTICAL PLAYER COMPRISING THE SCANNING DEVICE

[75] Inventor: Gerard E. Van Rosmalen, Eindhoven, Netherlands

[73] Assignee: U.S. Philips Corporation, New York, N.Y.

[21] Appl. No.: 165,057

[22] Filed: Dec. 7, 1993

[30] Foreign Application Priority Data

Dec. 17, 1992 [EP] European Pat. Off. ............ 92203983

[51] Int. Cl.$^6$ ................................ G11B 7/09; G11B 7/12
[52] U.S. Cl. .................. 369/219; 369/44.16; 369/44.22; 359/824
[58] Field of Search ................................. 369/219, 220, 369/221, 249, 215, 44.14, 44.22, 44.15, 44.16; 359/814, 823, 824

[56] References Cited

U.S. PATENT DOCUMENTS

| | | | |
|---|---|---|---|
| 4,408,313 | 10/1983 | Musha | 369/45 |
| 4,553,227 | 11/1985 | Kido et al. | 369/44 |
| 4,570,249 | 2/1986 | Malissin et al. | 369/219 |
| 4,766,584 | 8/1988 | Sekimoto et al. | 369/4 |
| 4,796,245 | 1/1989 | van Alem et al. | 369/44 |
| 4,942,562 | 7/1990 | Suzuki | 369/219 |
| 5,105,419 | 4/1992 | Ogura et al. | 369/219 |
| 5,124,965 | 6/1992 | Mizuno et al. | 369/44.14 |
| 5,161,067 | 11/1992 | Tomiyama et al. | 369/44.16 |
| 5,285,434 | 2/1994 | Kim et al. | 369/44.14 |
| 5,367,511 | 11/1994 | Aldenhoven et al. | 369/44.14 |

FOREIGN PATENT DOCUMENTS

| | | |
|---|---|---|
| 0178077 | 4/1986 | European Pat. Off. . |
| 9220196 | 9/1992 | European Pat. Off. . |
| 3315848 | 10/1984 | Germany . |
| 62-22246 | 1/1987 | Japan . |
| 63-69028 | 3/1988 | Japan ................... 369/44.14 |

OTHER PUBLICATIONS

"Principles of Optical Disc Systems" by G. Bouwhuis c.s., Philips Research Laboratories of Eindhoven, Adam Hilger Ltd., Bristol and Boston, 1985, §4.6.2, pp. 152–156.

*Primary Examiner*—Stuart S. Levy
*Assistant Examiner*—David L. Ometz
*Attorney, Agent, or Firm*—Leroy Eason

[57] ABSTRACT

A scanning device comprises a stationary section (1) with a frame (3) and a section (5) which is movable along a first axis (Z) and a second axis (X) oriented transversely of the first axis and which comprises a lens (7) having an optical axis (7a) parallel to the first axis. The scanning device comprises a focusing coil (13) for moving the lens along the first axis and two mutually parallel pairs of tracking coils (15a, 15b; 17a, 17b) for moving the lens along the second axis. The tracking coils of each pair are disposed along a line (19; 21) parallel to the second axis and have coil axes (23a, 23b; 25a, 25b) oriented transversely of a plane defined by the first axis and the second axis. Pairs of magnet poles (27a, 2b; 29a, 29b) are arranged at opposite sides of the lens, the magnet poles being spaced apart and being situated between two bounding planes (31; 33) oriented transversely of the second axis. In a center position of the lens each magnet pole is disposed opposite only one tracking coil and the tracking coils are situated exclusively between said bounding planes. The magnet poles have facing surfaces (35a, 35b; 37a, 37b) which bound a zone (39, 41) oriented transversely of the plane defined by the first axis and the second axis, coil portions (15a1, 15b1; 17a1, 17b1) of the tracking coils extending in said zone.

8 Claims, 3 Drawing Sheets

SCANNING DEVICE AND OPTICAL PLAYER COMPRISING THE SCANNING DEVICE

BACKGROUND OF THE INVENTION

The invention relates to a scanning device having a stationary section comprising a frame and movable section comprising a lens, which movable section is movable along a first axis and a second axis oriented transversely of said first axis, which device comprises a first actuating means and a second actuating means adapted to cooperate magnetically with said first actuating means v/a an air gap, one of said first and second actuating means comprising at least one focusing coil for moving the lens along the first axis and further comprising two pairs of tracking coils, which pairs extend parallel to one another, for moving the lens, which is disposed between the two pairs, along the second axis, which tracking coils of each pair are disposed along a line parallel to the second axis and have coil axes oriented transversely of a plane defined by the first axis and the second axis, the other means of said first and second means comprising magnets.

A prior art scanning device is known from EP-A 0,178,077 (herewith incorporated by reference). The known scanning device for scanning an optical recording medium by means of a scanning spot comprises a stationary base and a body which is movable relative to this stationary base. The movable body carries a lens and two magnets fixed to side surfaces of the movable body which face away from one another. Opposite the magnets, the base carries focusing coils for moving the movable body in two opposite focusing directions and tracking coils for moving said body in two opposite tracking directions transverse to said focusing directions, one pair of tracking coils being arranged opposite each magnet. The magnets have a coincident magnetic axis oriented transversely of the focusing directions and the tracking directions. The tracking coils situated opposite the magnets have vertical active coil portions, i.e. coil portions which extend in the focusing directions, which coil portions are situated in an area directly opposite a magnet pole in a center position of the movable body. Vertical inactive coil portions are situated outside this area and are connected to the active coil portions by horizontal inactive coil portions. The focusing coils have horizontal active coil portions for moving the lens into focus positions.

In the prior-art electro-optical scanning device, which is used in a focus and tracking control system, stray fields of the magnets result in undesired magnetic forces being exerted on the movable section by the horizontal inactive coil portions when the tracking coils are energized. In the center position, particularly viewed in the focusing direction, these forces on a tracking coil cancel one another because of the symmetry in the assembly of magnets and tracking coils. However, if the lens is in a focus position, in which the movable body has been moved in an upward or downward direction relative to the center position, oppositely directed magnetic forces of different magnitude are produced at the mutually parallel horizontal inactive coil portions of each tracking coil. In a pair of tracking coils this gives rise to two parallel opposite disturbing forces, as a result of which the movable body is subjected to undesired torques about an axis transverse to the focusing direction and the tracking directions. During tracking this may result in substantial resonances of the movable body about said axis, so that the scanning spot performs undesirable to and fro excursions, which are interpreted as additional error signals by the control system. In the case of a large amplitude of the undesired excursions these error signals may give rise to complete failure of the control system.

The tracking coils of the prior-art scanning device have active vertical coil portions which are long relative to the height dimensions of the magnets. This has the drawback that it leads to a large overall height. Another drawback is that the tracking coils are used inefficiently because the magnetic forces to be produced in a tracking direction are small in comparison with the required energy as a result of unnecessary heat losses. Both drawbacks can be mitigated by the use of shorter active vertical coil portions. However, a drawback of applying such a measure to the prior-art scanning device is that when the tracking coils are energized undesired torques about the axis transverse to the focusing directions and tracking directions may be generated which amplify the undesired torques already mentioned above. The undesired torques, as result of the use of short active vertical coil portions, arise in focus positions of the lens in which the magnets have been moved in a focusing direction relative to the tracking coils because the points where the magnetic actuating forces act on the movable body are shifted in a focusing direction when the tracking coils are energized.

SUMMARY OF THE INVENTION

It is an object of the invention to improve the scanning device of the type defined in the opening paragraph in such a manner that the movable section, in particular the lens thereof, performs accurately defined movements during tracking.

The scanning device in accordance with the invention is characterized in that pairs of magnet poles are arranged at opposite sides of the lens, the magnet poles being spaced from one another and being disposed between two bounding planes oriented transversely of the second axis and, in a center position of the lens, each magnet pole being disposed opposite only one tracking coil and the tracking coils being situated exclusively between said bounding planes, the magnet poles of a pair having surfaces which face one another and which bound a zone oriented transversely of the plane defined by the first axis and the second axis, coil portions of the tracking coils extending in said zone.

The scanning device in accordance with the invention has such magnet pole and tracking coil configurations that each pair of tracking coils comprises two active coil portions situated directly opposite the magnet poles and two coil portions which are disposed between said active coil portions and in magnetic stray fields of the magnet poles. When the tracking coils are energized magnetic actuating forces directed parallel to the second axis are exerted on the movable section in order to move the movable section, in particular the lens, along the second axis, i.e. in a tracking direction. By energizing the coil said movable section and, consequently, the lens can be moved in a focusing direction parallel to the first axis for the purpose of focusing a radiation beam.

In the scanning device in accordance with the invention, just as in the described prior-art device, torques may be produced when the tracking coils are energized in focus positions of the lens in which the movable section has been moved relative to the center position along the first axis. Surprisingly, it has been found, however, that these torques act oppositely in pairs and are equal or substantially equal in magnitude in compact practical embodiments without additional measures being required, so that the torques at least substantially cancel one another. Therefore, the scanning device in accordance with the invention does not suffer from annoying resonances of the movable section during tracking.

An embodiment of the scanning device is characterized in that the tracking coils are bent, said coil portions extending as far as between the facing surfaces of the magnet poles. This embodiment efficiently utilizes the stray fields of the magnet poles, so that large actuating forces are generated when the tracking coils are energized.

An embodiment is characterized in that the tracking coils form part of the movable section and the magnet poles form part of the stationary section. In this embodiment the actuating means, having the smallest mass, is arranged to be movable relative to the frame, which is favourable for the power consumption. Preferably, the actuating means comprising the first actuating means and the second actuating means is arranged symmetrically with respect to the lens.

The invention further relates to an optical player comprising the scanning device in accordance with the invention. Such a player can be used for optically reading an optical disc, for example a CD or CD-ROM, or for magneto-optically inscribing and/or reading an magneto-optical disc, such as a 3½ MO disc. The invention aims at providing an optical player with very short access times.

The optical player in accordance with the invention comprises a slide carrying the scanning device, and a frame for guiding the slide, the frame comprising a turntable and resilient means which extend in a direction parallel to the optical axis and to which the frame of the scanning device is secured. The presence of resilient means counteracts the transmission to the frame of forces produced when the focusing coil is energized. This precludes the occurrence of "wow". For more information about "wow" reference is made to the book "Principles of Optical Disc Systems", G. Bouwhuis c.s., Philips Research Laboratories of Eindhoven, Adam Hilger Ltd., Bristol and Boston, 1985, in particular §4.6.2, pp. 152–156. The actuating means used in the scanning device in accordance with the invention are capable of exerting forces on the movable section such that in the case of high accelerations of the slide, in order to achieve short access times, the movable section follows the slide and hence the frame without any problems.

The resilient means used in the optical player in accordance with the invention preferably comprise two blade-spring-like supporting elements, each having a fixed end connected to the slide and a free end supporting the frame of the scanning device, which extends between the supporting elements.

Preferably, the suspension used between the movable section of the electro-optical scanning device in accordance with the invention and the slide of the player in accordance with the invention is of the type as described in the EP Patent Application bearing the application number 92201962.5 to which U.S. Pat. No. 5,367,511 corresponds, herewith incorporated by reference). The suspension comprises two parallel frame-shaped supports which are oriented parallel to the first axis and transversely of the second axis, which supports each comprise two elongate spaced-apart first elements which extend at least substantially parallel to the first axis, which can deflect elastically about an axis parallel to the second axis and which can be twisted elastically about an axis parallel to the first axis, and two elongate spaced-apart stiff second elements coupling said two first elements to one another, the first elements having their ends rigidly connected to the second elements, one of said two first elements having a central portion, which is situated between said two second elements, secured to the slide, and the other first element having its central portion, which is situated between said two second elements, secured to the movable section of the scanning device.

Said suspension enables the movable section of the scanning device in accordance with the invention to be moved in the focusing and the tracking directions, movements in other directions being counteracted. The blade-spring-like elements deflect while focusing movements are performed and the blade-spring-like elements are twisted while tracking movements are performed. The proposed suspension has a number of favourable properties, such as a satisfactory guidance, a high torsional stiffness in various directions, a stable neutral position and a low mass, and is highly immune to temperature variations.

The invention will now be described in more detail, by way of example, with reference to the drawings.

DESCRIPTION OF THE PREFERRED EMBODIMENT

Figure 1:
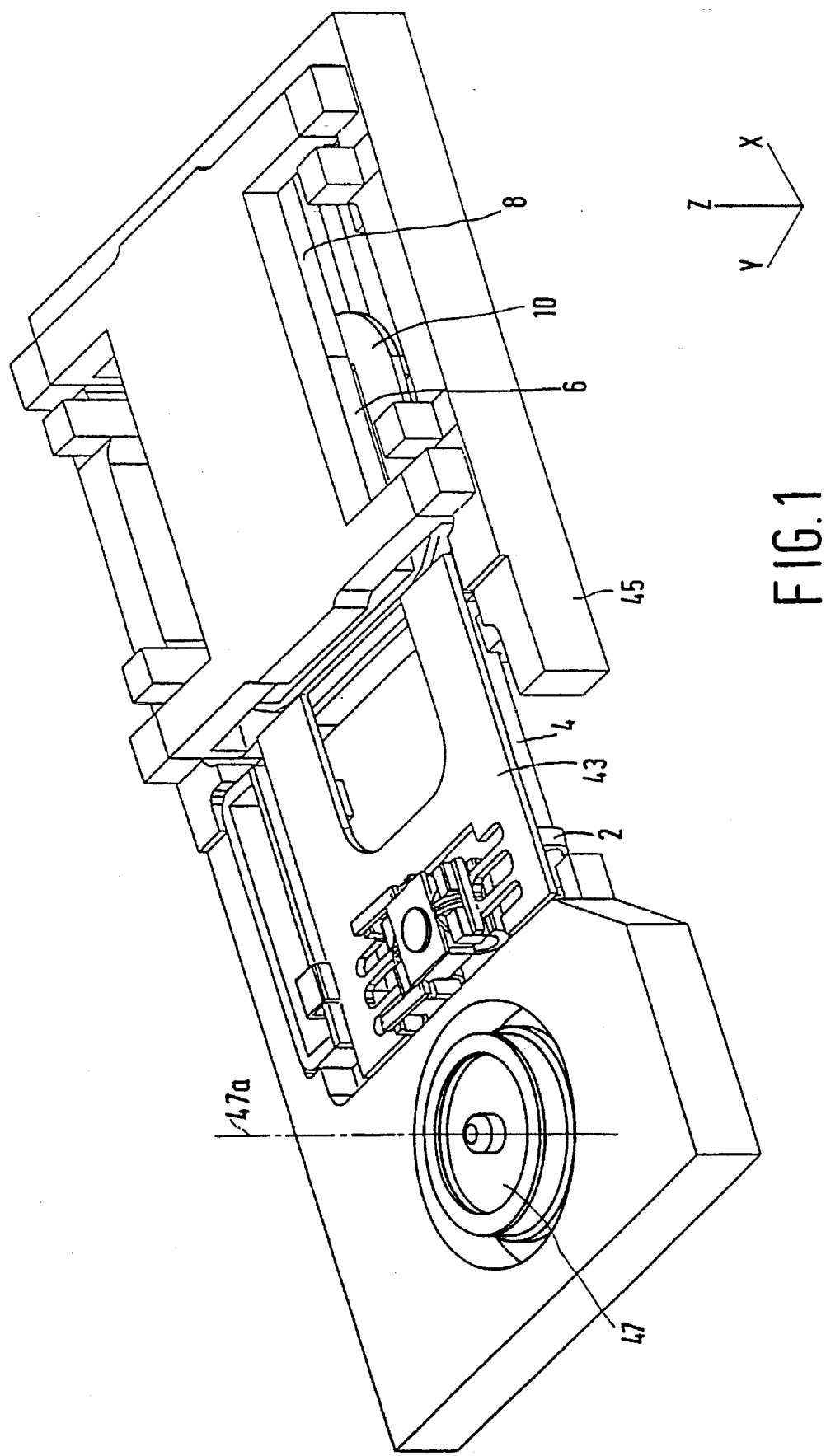
FIG. 1 is a perspective view of an embodiment of the optical player in accordance with the invention.

The player in accordance with the invention shown in FIG. 1 comprises a slide 43 and a frame 45 for guiding the slide 43. The frame 45 supports a turntable 47 which is rotatable about an axis of rotation 47a. The turntable 47 may be adapted to support disc-shaped information carriers such as optical discs, for example CDs, and/or magneto-optical discs. The axis of rotation 47a of the turntable 47 extends parallel to a first axis Z (the Z axis) of a system of orthogonal axes X, Y, Z shown in the drawing. The turntable 47 can be driven by an electric motor mounted in the frame. The slide 43 is movable relative to the turntable 47 in radial directions, i.e. parallel to a second axis X (the X axis) of the shown system of axes. For this purpose the slide 43 has bearings 2 cooperating with guide rods 4 of the frame 45. The slide 43 is driven by energizing an actuator coil 10 secured to the slide and arranged opposite the magnets 6 and 8. Such a slide drive arrangement is known per se from DE 33 15 848. The slide 43 carries a scanning device which is shown in detail in FIGS. 2 and 3.

Figure 2:
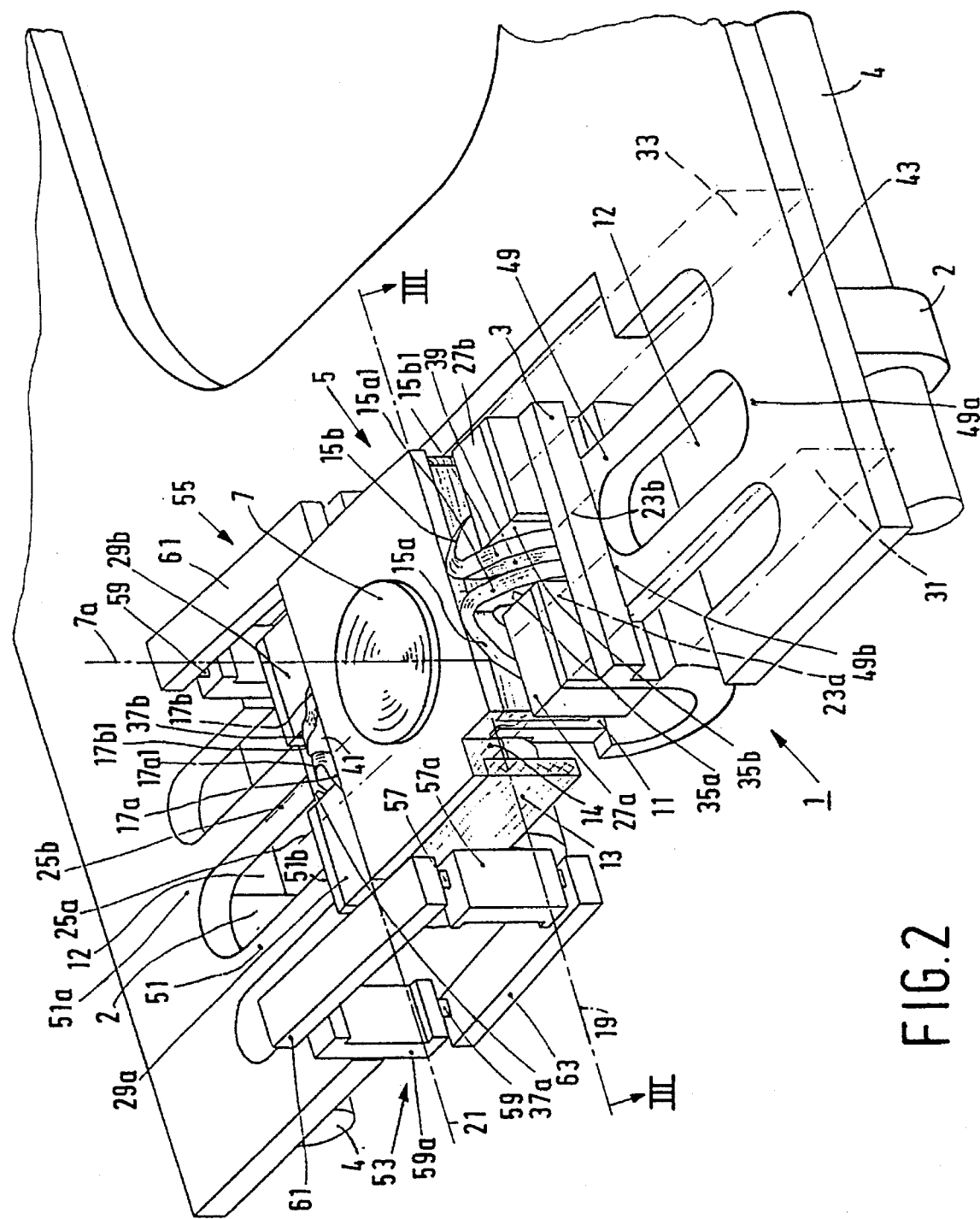
FIG. 2 is a perspective view of a special embodiment of the scanning device in accordance with the invention used in the player shown in FIG. 1.
Figure 3:
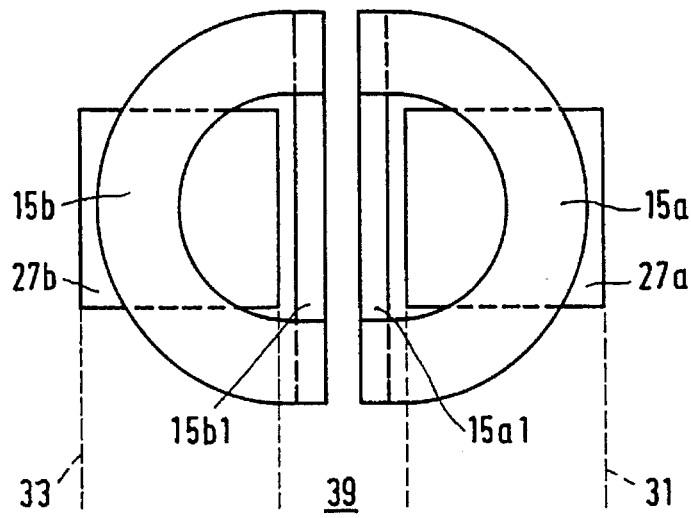
FIG. 3 shows a part of the scanning device in a sectional view taken on the line III—III in FIG. 2.

The scanning device in accordance with the invention shown in FIGS. 2 and 3 comprises a stationary first section 1 and a second section 5 which is movable relative to this stationary section. The stationary section 1 has a frame 3 secured to resilient means of the slide 43. In the present example the frame 3 comprises two parts, each part being used as a magnetic yoke and being supported on a free end 49b and 51b, respectively, of two blade-spring-like supporting elements 49 and 51 of said resilient means. The supporting elements 49 and 51, having a fixed end, 49a and 51a respectively, integral with the slide 43, are elastic in directions parallel to the Z axis and may each have an opening 12.

The movable second section 5 has a central body 15 in which a focusing lens 7 is secured, which lens has an optical axis 7a parallel to the Z axis. The second section 5 is movable relative to the first section 1 along the Z axis and the X axis of the shown system of axes. The section 5 is supported relative to the frame 5 by means of a suspension comprising two parallel frame-shaped supports 53 and 55 which extend parallel to the Z axis and transversely of the X axis. Each support 53 and 55 comprises two metal or plastics blade springs or blade-spring-like first elements 57 and 59 which extend parallel to the Z axis, which can deflect elastically about an axis parallel to the Y axis and which can be twisted elastically about an axis parallel to the Z axis. For this purpose, the supports 53 and 55 each comprise two stiff elongate plastics second elements 61 and 63 which extend parallel to the Y axis, in which the ends of the elements 57 and 59, which in the present example are metal elements, are embedded. The first elements 57 have plastic central portions 57a secured to the movable section 5. The second elements 59 have similar central portions 59a which are formed by encapsulation and which are secured to the slide 43.

The scanning device in accordance with the invention is intended for scanning a disc-shaped optically scanned information carrier. Such an information carder, for example a CD, comprises an information surface with an information track. Scanning is effected by means of a radiation beam emitted by a light source, particularly a laser, of the optical player. This radiation beam is passed through the lens 7 and is focused by means of a focus control system to form a scanning spot on the information surface. A tracking control system ensures that the scanning spot accurately follows the information track during scanning.

The movable section 5 of the scanning device has a focusing coil 13 surrounding the central body 14 and connected to the focus control system, which coil has turns disposed in planes parallel to the X-Y plane of the system of orthogonal axes. The section 5 also carries two pairs of tracking coils 15a, 15b and 17a, 17b connected to the tracking system. The tracking coils 15a and 15b are situated at one side of the central body 14 and extend along a line 19 parallel to the X axis, whereas the tracking coils 17a and 17b are situated at an opposite side and extend along a line 21 parallel to the line 19. The tracking coils 15a, 15b and 17a, 17b, which are secured to the focusing coil 13, have coil axes 23a, 23b and 25a, 25b, respectively, which in principle extend parallel to the Y axis.

A pair of magnet poles 27a, 27b and 29a, 29b is arranged opposite each pair of tracking coils 15a, 15b and 17a, 17b, respectively, to cooperate with the coils via an air gap 11. In the present example the magnet poles take the form of permanent magnets having magnetic axes oriented parallel to the Y axis and having polefaces of like polarity facing the tracking coils. The magnet poles 27a, 27b and 29a, 29b are situated within an area defined by two bounding planes 31 and 33 extending parallel to the Y-Z plane of the shown system of axes. Each pair of magnet poles 27a, 27b and 29a, 29b has two facing surfaces 35a, 35b and 37a, 37b, respectively, bounding a zone 39, 41 which extends in the Y and Z directions. The tracking coils 15a, 15b and 17a, 17b are positioned in such a manner that at least in a center position of the movable section 5 and, consequently, of the lens 7, with respect to movement in the X direction, the tracking coils are situated wholly within the area defined by the bounding planes 31 and 33. In FIG. 2 the lens is shown in this center position. The tracking coils 15a, 15b and 17a, 17b each extend opposite a magnet pole, one coil portion being disposed directly opposite a pole face. The tracking coils each also have respective portions 15a1, 15b1, 17a1 and 17b1 disposed in said zone 39, 41. The originally flat annular tracking coils 15a, 15b and 17a, 17b may be bent, as is the case in the present example, so that said coil portions 15a1, 15b1, 17a1 and 17b1 are disposed opposite the magnet pole surfaces 35a, 35b and 37a, 37b, respectively.

Figure 4:
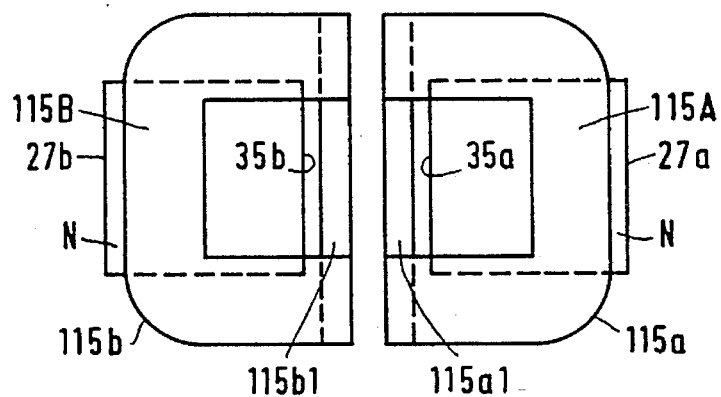
FIG. 4 shows a modification of the part shown in FIG. 3 with a movable section shown in a center position.

Except for the shape of the tracking coils, the part shown in FIG. 4 wholly corresponds to the part shown in FIG. 3 and can therefore readily be used in the scanning device shown in FIG. 2.

Figure 5:
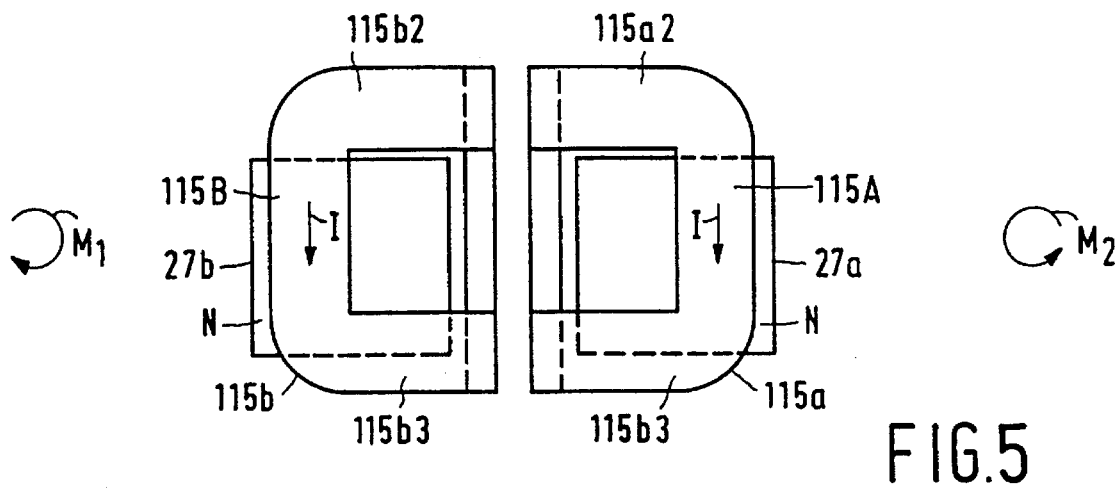
FIG. 5 shows the modification of FIG. 4 with the movable section shown in a focusing position.

In FIGS. 4 and 5 said non-modified parts bear the same reference numerals as used above.

In the embodiment shown in FIG. 4, in a center position of the lens, viewed in both the X direction and the Z direction, a pair of substantially rectangular tracking coils 115a and 115b extend opposite the permanent magnet poles 27a and 27b respectively, first coil portions 115A and 115B being disposed in the magnetic field opposite the pole faces N (in the present example north poles) of the magnet poles 27a and 27b. The originally flat coils 115a and 115b are bent so that second coil portions thereof 115a1 and 115b1 are each disposed in a magnetic stray field between the facing surfaces 35a and 35b of the magnet poles 27a and 27b.

An advantage of the scanning device in accordance with the invention will now be illustrated by means of FIG. 5. FIG. 5 shows a focus position of the movable section in which the tracking coils 115a and 115b have been moved in the Z direction with respect to the situation shown in FIG. 4 (for the system of orthogonal axes see FIG. 1). When the tracking coils 115a and 115b are energized, resulting for example in a current I flowing through both coils 115a and 115b, two opposing torques are exerted on the movable section carrying the lens in the focus position shown. A first torque M1 about the Y axis is produced by coil portions 115a2, 115a3 and coil portions 115b2, 115b3 of the coils 115a and 115b respectively. Since the tracking coils are disposed non-symmetrically in the magnetic field of the magnet poles 27a and 27b, said coil portions 115a2, 115a3, 115b2, and 115b3 also produce two oppositely directed resultant forces oriented parallel to the Z axis. A second torque acting about the Y axis and opposing the first torque is produced in said position when the tracking coils are energized as stated, in that, in contradistinction to the situation in the center position shown in FIG. 4, the generated resultant actuating force parallel to the X axis does not extend exactly through the mass center of the movable section. However, surprisingly it has been found that in the embodiments shown both torques not only oppose one another but are also substantially equal in absolute magnitude, so that for practical purposes the basically disturbing torques substantially cancel one another and these torques are not annoying.

It is to be noted that the invention is not limited to the examples shown and described herein.

I claim:

1. A scanning device having a first section, a movable second section including a lens having an optical axis, means for mounting the movable section with respect to the first section to allow movement along a first axis for focusing the lens and movement along a second axis transverse to the first axis, and an actuator structure for causing the movable section to move along each of said axes, wherein the actuator structure comprises at least one focusing coil, two pairs of tracking coils, and a plurality of magnet portions, each of the tracking coils has a respective coil axis oriented transversely of a plane defined by said first and second axes, the tracking coils of a pair are disposed along a line parallel to the second axis, and the lens is disposed between the pairs of tracking coils, characterized in that said plurality of magnet portions comprises two pairs of magnet poles, each pole having a pole face and a pole surface; said pairs of poles being arranged at opposite sides of the optical axis of the lens such that the pole faces of each pair of poles face the coils of a respective pair of said tracking coils, the poles of each respective pair are spaced from one another, the pole surfaces thereof facing each other and bounding a respective zone oriented transversely of a plane defined by said first and second axes, and in a center position of the lens, each pole face is symmetrically positioned with respect to the tracking coil facing said pole face, and portions of each pair of tracking coils extend into said zone between the pole surfaces of the associated pair of poles;

whereby torques exerted on said tracking coils by stray magnetic fields produced by said magnet poles balance out to a substantial degree even when said lens is moved from said center position thereof by operation of said focusing coil.

2. A scanning device as claimed in claim 1, characterized in that the tracking coils form part of the movable section and the magnet poles form part of the first section.

3. An optical player comprising a scanning device as claimed in claim 1, and further comprising a slide carrying the scanning device and a frame for guiding the slide; wherein said frame for guiding the slide comprises a turntable, and said slide includes resilient means which are elastic in a direction parallel to the optical axis and to which the frame of the scanning device is secured.

4. A player as claimed in claim 3, wherein said resilient means comprise two blade-spring-like supporting elements, each having a fixed end connected to the slide and a free end supporting the frame of the scanning device, said scanning device extending between the supporting elements.

5. A player as claimed in claim 3, characterized in that the movable section of the scanning device is secured to the slide by means of a suspension comprising two parallel frame-shaped supports which are oriented parallel to the first axis and transversely of the second axis, which supports each comprise two elongate spaced-apart first elements which extend at least substantially parallel to the first axis, which can deflect elastically about an axis parallel to the second axis and which can be twisted elastically about an axis parallel to the first axis, and two elongate spaced-apart stiff second elements coupling said two first elements to one another, the first elements having ends rigidly connected to the second elements, one of said two first elements having a central portion, which is situated between said two second elements, secured to the slide, and the other first element having a central portion, which is situated between said two second elements, secured to the movable section of the scanning device.

6. A scanning device as claimed in claim 1, characterized in that the tracking coils are bent to form the coil portions which extend into said zone.

7. A scanning device having a stationary section and a movable section comprising a lens, the moveable section being moveable relative to the stationary section along a first axis (Z) and along a second axis (X) oriented transversely to the first axis; said device further comprising:

focus actuating means comprising at least one focusing coil for causing the moveable section to move along said first axis;

tracking actuating means comprising two pairs of tracking coils, the two pairs extending parallel to each other on opposite sides of said lens, for causing the moveable section to move along said second axis; the tracking coils of each pair being arranged along a line parallel to the second axis, each tracking coil having an axis oriented transversely to a plane defined by the first and second axes;

two pairs of magnet poles arranged on opposite sides of said lens, the magnet poles of each pair respectively facing the tracking coils of one of said pairs of tracking coils and being included between two bounding planes oriented transversely to the second axis, there being a space between the magnet poles of each pair constituting a zone extending transversely to the plane defined by the first and second axes;

each of said pairs of said tracking coils being included entirely between said two bounding planes and, when said lens is at a center position, each magnet pole being symmetrically positioned with respect to the tracking coil facing said magnet pole; and portions of the tracking coils of each pair thereof extend into said zone between the magnet poles facing said tracking coils;

whereby torques exerted on said tracking coils by stray magnetic fields produced by said magnet poles balance out to a substantial degree even when said lens is moved from said center position by operation of said focus actuating means.

8. A scanning device as claimed in claim 7, characterized in that the focus actuating means and the tracking actuating means are each arranged symmetrically relative to the lens.

* * * * *